United States Patent [19]

Meermoller et al.

[11] Patent Number: 4,476,808

[45] Date of Patent: Oct. 16, 1984

[54] DEVICE FOR AUTOMATICALLY RINSING MILKING SYSTEMS

[75] Inventors: Theodor Meermoller; Heinrich Greshof, both of Oelde, Fed. Rep. of Germany

[73] Assignee: Westfalia Separator AG, Oelde, Fed. Rep. of Germany

[21] Appl. No.: 467,556

[22] Filed: Feb. 17, 1983

[30] Foreign Application Priority Data

Mar. 6, 1982 [DE] Fed. Rep. of Germany ....... 3208197

[51] Int. Cl.³ .............................................. A01J 7/00
[52] U.S. Cl. .................................. 119/14.18; 134/56 R
[58] Field of Search .................... 119/14.18; 134/56 R, 134/57 R

[56] References Cited

U.S. PATENT DOCUMENTS

| | | | |
|---|---|---|---|
| 2,997,049 | 8/1961 | Thomas | 119/14.18 X |
| 3,116,714 | 1/1964 | Bender | 119/14.18 |
| 3,228,374 | 1/1966 | Sampson et al. | 119/14.18 |

Primary Examiner—Hugh R. Chamblee
Attorney, Agent, or Firm—Sprung, Horn, Kramer & Woods

[57] ABSTRACT

A milking system in which milk is drawn during milking into a vacuumized milk collector and let off through a downstream sluice is rinsed automatically with air being admitted periodically into a preliminary-run line of an automatic rinser to improve rinsing. A preliminary-run container is positioned between the sluice and a preliminary-run line of the automatic rinser and communicates through connecting lines with the preliminary-run line and the sanitary trap and through a run-off and a connecting line with the sluice. Valves are mounted in the run-off and open the line to the sluice only when there is liquid in the preliminary-run container and a vacuum in the sluice. This prevents atmospheric air from flowing from the preliminary-run line into the sluice or air from being drawn out of the sluice when there is atmospheric pressure in the sluice.

6 Claims, 1 Drawing Figure

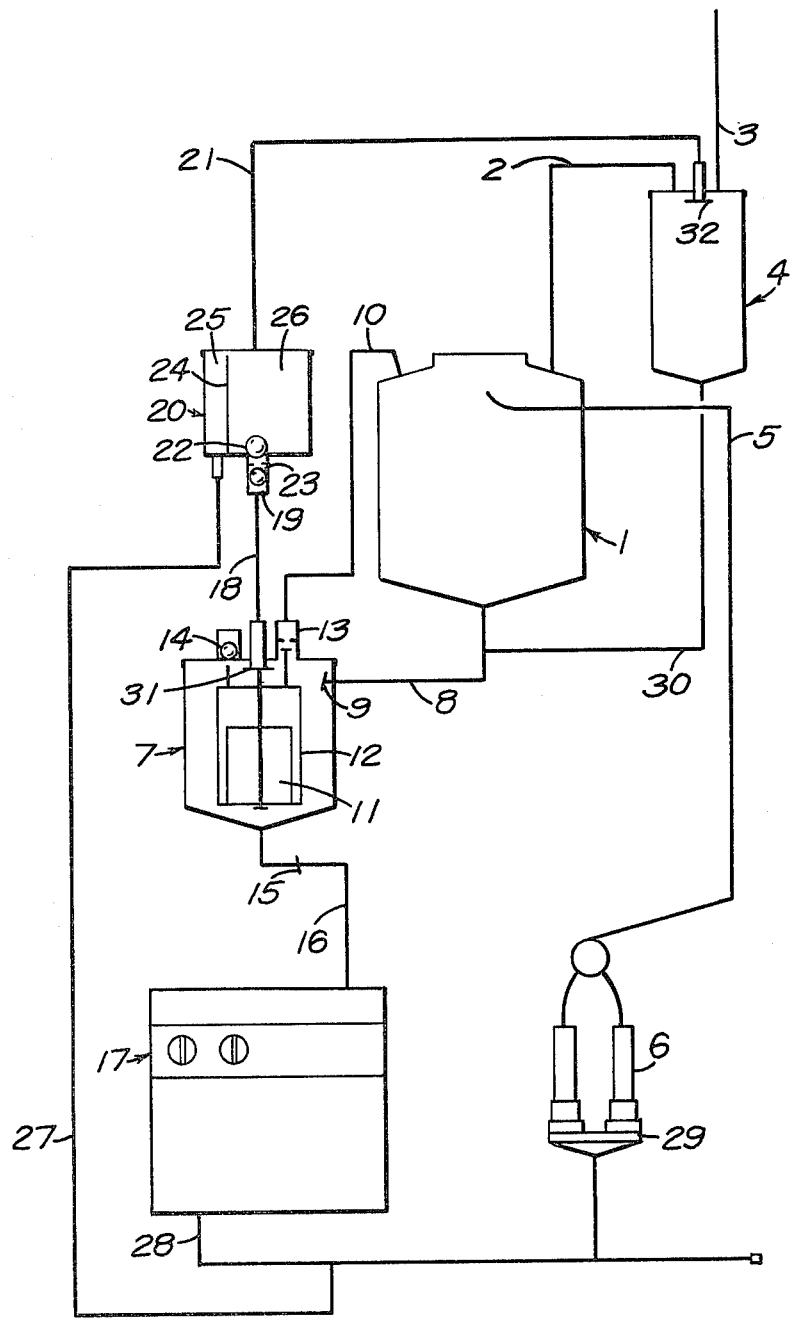

DEVICE FOR AUTOMATICALLY RINSING MILKING SYSTEMS

BACKGROUND OF THE INVENTION

The invention relates to a device for automatically rinsing milking systems with automatic rinsers, with the milk drawn into a constantly vacuumized milk collector upstream of a constantly vacuumized sanitary trap during milking and the rinsing solution drawn into the same milk collector during rinsing, the milk or the rinsing solution being conveyed onward by a sluice with a float that, when liquid is entering, activates valves that shut off a vacuum line between the sluice and the milk collector and open a line containing a ball valve leading out to the atmosphere.

The rinsing of milking systems of this type with automatic rinsers is known. The rinsing solution is drawn out of a preliminary-run line coming from the automatic rinser, through the milking clusters into the milk line, and back into the automatic rinser through the milk collector and sluice.

Air is periodically admitted into the preliminary-run line to improve cleaning, generating what are called water columns, which especially promote rinsing. The activity of the water column ends at the milk collector, however, because the rinsing solution can be let off into the sluice only under hydrostatic pressure.

This means that only the bottom of the sluice will be wetted with rinsing solution, and the sluice in a known milking system must be cleansed manually to prevent the milk from becoming infected.

Attempts have been made to find a way of rinsing the top of the sluice as well by positioning a connecting line between the preliminary-run line of the automatic rinser and the top of the sluice. Since, however, the sluice is powered alternately by a vacuum and by atmospheric pressure, the periodic admission of air into the preliminary-run line of the automatic rinser during the vacuum phase causes the vacuum to break down in the sluice and the sluice to malfunction. Since air is drawn out of the sluice through the connecting line during the phase of atmospheric-pressure build-up, atmospheric pressure is not completely attained in the sluice and the liquid can not be sluiced out.

Since milk vapor and spurts of milk can produce concentrations of bacteria in the sanitary trap as well, this vessel must also be cleaned. It is therefore desirable, to avoid complicated manual labor, to include the sanitary trap in the rinsing system as well.

A milking system known from German Pat. No. 2 335 877 has a conveyor pump downstream of the milk collector, connecting the bottom run-off of the sanitary trap with the suction side of the pump through a gate that is closed during milking and open during rinsing, while a branch line with a relatively small cross-section leads from the pressure side of the pump and opens into the top of the sanitary trap. The disadvantage of this solution is that the lines leading from the pump to the sanitary trap must be emptied by hand before cleaning and the gate subsequently opened. Such manual operations can lead to mishandling that can make both the milking and the rinsing functions of the milking system problematic.

SUMMARY OF THE INVENTION

The object of the present invention is to provide a device that will automatically rinse milking systems of this type and that will also rinse the top of the sluice without affecting its function and include the sanitary trap in the rinsing system without having to activate a gate.

This object is achieved in a milking system of the type initially described wherein a preliminary-run container is positioned between the sluice and a preliminary-run line of the automatic rinser and communicates through connecting lines with the preliminary-run line and the sanitary trap and through a run-off and a connecting line with the sluice, wherein valves are mounted in the run-off, wherein one valve opens while the preliminary-run container is filling and the second valve does not open until the sluice becomes vacuumized, whereupon rinsing solution flows through the connecting line into the sluice, and wherein the second valve closes again as soon as atmospheric pressure builds up in the sluice, whereupon the preliminary-run collector will fill up and rinsing solution will flow through the connecting line into the sanitary trap.

This will ensure alternate automatic rinsing of the sluice and the sanitary trap during the rinsing process without any outside air getting out of the preliminary-run line of the automatic rinser into the sluice or out of the sluice into the preliminary-run line.

The first valve in the preliminary-run container is preferably a float valve in the form of a sphere with a specific gravity that is lower than that of the rinsing solution. To prevent the ball from being immediately washed out of its closed position by the turbulence of the entering rinsing solution, the site at which the solution enters the preliminary-run container is separated from the vicinity of the valve by a vertical partition. The capacity of the preliminary-run container can accordingly be less than 500 cm$^3$.

To ensure that the rinsing solution will have full access to all surfaces of the sluice and sanitary trap, each connecting line is provided with a spray head where it enters the top of these components.

BRIEF DESCRIPTION OF THE DRAWINGS

The invention will now be specified with reference to one embodiment illustrated in the attached drawing in which the FIGURE is a schematic thereof.

DETAILED DESCRIPTION OF THE INVENTION

In the FIGURE, a milk collector 1 communicates through a vacuum line 2 with a sanitary trap 4, which is constantly vacuumized by a line 3, and through a milk line 5 with a milking cluster 6. A sluice 7 is positioned downstream of milk collector 1, with which it communicates through a run-off line 8, into which is built a valve flap 9, and through a vacuum line 10. Sluice 7 has a float 11 that activates selector rods 12 when liquid enters the sluice. Selector rods 12 close a valve 13 in vacuum line 10 and open a ball valve 14 to the outside atmosphere. The outflow line 16, which has a valve flap 15, from sluice 7 communicates with an automatic rinser 17 during rinsing. The top of sluice 7 communicates through a connecting line 18 with the run-off 19 of a preliminary-run container 20. Preliminary-run container communicates through a connecting line 21 with sanitary trap 4. Two valves 22 and 23 are positioned in run-off 19. Preliminary-run container 20 is divided by a partition 24 into a run-in section 25 and a valve section 26. A connecting line 27 leads from run-in section 25 to a preliminary-run line 28 of automatic rinser 17. Milking cluster 6 communicates through milking-cluster holder 29 with preliminary-run line 28 during rinsing. The evacuation line 30 of sanitary trap 4 communicates with the run-off line 8 of milk collector 1. The opening of connecting line 18 into sluice 7 and the opening of connecting line 21 into sanitary trap 4 are each provided with a spray head 31 and 32.

When the milking system is being rinsed, the rinsing solution flows out of automatic rinser 17 into preliminary-run line 28 and is drawn by vacuum through milking-cluster holder 29, milking cluster 6, and milk line 5 into milk collector 1. The solution flows out of milk collector 1 through run-off line 8 and valve flap 9 into sluice 7, which is also vacuumized. Rinsing solution is simultaneously drawn out of preliminary-run line 28 through connecting line 27 into the run-in section 25 of preliminary-run container 20, which is constantly vacuumized through connecting line 21. When run-in section 25 is full, the rinsing solution spills over the top of partition 24 into valve section 26, opening valve 22 as it fills the section. Since valve 23 is also open when sluice 7 is vacuumized, the solution now flows out of the preliminary-run container into the sluice 7.

When ascending float 11 reaches selector rods 12, the rods begin to rise with the float, closing valve 13 to vacuum line 10 and opening ball valve 14 to the atmosphere. The air flowing into sluice 7 will simultaneously force atmospheric air through connecting line 18 to the run-off 19 of preliminary-run container 20, closing valve 23. The rinsing solution drawn into the preliminary-run container now flows into the sanitary trap 4. As atmospheric pressure builds up in sluice 7, valve flap 9 will close the run-off line 8 of milk collector 1 and valve flap 15 will open the out-flow line 16 leading from sluice 7 to automatic rinser 17. As soon as float 11 reaches the bottom of selector rods 12 as the liquid level in sluice 7 drops, valve 13 will open again and ball valve 14 close, so that sluice 7 will again become vacuumized and the rinsing solution can flow out of milk collector 1 and preliminary-run container 20 into the sluice. If air is admitted to preliminary-run line 28 to improve rinsing, the supply of rinsing solution will be interrupted. Once the preliminary-run container is empty, valve 22 will shut run-off 19 to sluice 7 to prevent malfunction of the sluice as the result of the admission of air during the evacuation phase.

In milking systems that lack a sanitary trap, it is practical for line 21 to communicate with the top of milk collector 1.

It will be appreciated that the instant specification and claims are set forth by way of illustration and not limitation, and that various modifications and changes may be made without departing from the spirit and scope of the present invention.

What is claimed is:

1. In a milking system having an automatic rinser and a milking cluster from which milk and rinsing solution is drawn into a constantly vacuumized milk collector which is upstream of a constantly vacuumized sanitary trap during milking and rinsing respectively, a sluice for conveying the milk or the rinsing solution onward and having a float, an outflow line connected to the rinser, a vacuum line and a liquid run-off line between the sluice and the milk collector, means forming an opening to the atmosphere, and two sluice valves activated by the float upon the entry of liquid into the sluice to close the formerly open vacuum line and open the formerly closed opening to the atmosphere, the improvement comprising: a preliminary-run line connecting the rinser and the milking machine, and a preliminary-run container positioned between the sluice and the preliminary-run line and communicating through first and second connecting lines with the preliminary-run and the sanitary trap respectively and through a run-off and a third connecting line with the sluice, the preliminary-run container comprising a first valve mounted in the rub-off and which is normally open while the preliminary-run container is filling and a second valve in the run-off which is only movable to an open position when the sluice becomes vacuumized, thereby effecting the flow of rinsing solution through the third connecting line into the sluice, and wherein the second valve is closed in response to a build up of atmospheric pressure in the sluice, thereby effecting the filling of the preliminary-run collector and the flow of rinsing solution through the second connecting line into the sanitary trap.

2. The system according to claim 1, wherein the capacity of the preliminary-run container is less than 500 cm$^3$.

3. The system according to claim 1, wherein said first and second valves comprise ball valves.

4. The system according to claim 1, further comprising a spray head at the ends of the second and third connecting lines where they enter the top of sanitary trap and sluice respectively.

5. The system according to claim 1, wherein the preliminary-run container further comprises a partition dividing same into a run-in section with which said first connecting line communicates and a valve section with which said second connecting line and run-off communicate.

6. The system according to claim 5, wherein the capacity of the preliminary-run container is less than 500 cm$^3$.

* * * * *

UNITED STATES PATENT AND TRADEMARK OFFICE
CERTIFICATE OF CORRECTION

PATENT NO. : 4,476,808

DATED : October 16, 1984

INVENTOR(S) : Theodor Meermoller, et al

It is certified that error appears in the above-identified patent and that said Letters Patent is hereby corrected as shown below:

| | |
|---|---|
| Col. 1, line 26 | Delete "column" and substitute --columns-- |
| Col. 4, line 21 | After "preliminary-run" insert --line-- |

Signed and Sealed this

Twenty-fifth Day of June 1985

[SEAL]

Attest:

DONALD J. QUIGG

Attesting Officer

Acting Commissioner of Patents and Trademarks